(12) United States Patent
Desch et al.

(10) Patent No.: US 10,676,881 B2
(45) Date of Patent: Jun. 9, 2020

(54) DRIVE DEVICE FOR A CONSTRUCTION MACHINE

(71) Applicant: DESCH Antriebstechnik GmbH & Co. KG, Arnsberg (DE)

(72) Inventors: Hendrik Peter Desch, Arnsberg (DE); Bernhard Plattfaut, Hamm (DE)

(73) Assignee: DESCH ANTRIEBSTECHNIK GMBH & CO. KG, Arnsberg (DE)

( * ) Notice: Subject to any disclaimer, the term of this patent is extended or adjusted under 35 U.S.C. 154(b) by 69 days.

(21) Appl. No.: 15/765,877

(22) PCT Filed: Oct. 21, 2016

(86) PCT No.: PCT/EP2016/075396
§ 371 (c)(1),
(2) Date: Apr. 4, 2018

(87) PCT Pub. No.: WO2017/068133
PCT Pub. Date: Apr. 27, 2017

(65) Prior Publication Data
US 2018/0283513 A1    Oct. 4, 2018

(30) Foreign Application Priority Data

Oct. 22, 2015    (DE) .................. 10 2015 118 000

(51) Int. Cl.
*E01C 23/088*        (2006.01)
*B60K 25/00*         (2006.01)
(Continued)

(52) U.S. Cl.
CPC ............ *E01C 23/088* (2013.01); *B60K 25/00* (2013.01); *E01C 23/127* (2013.01); *F16H 37/065* (2013.01)

(58) Field of Classification Search
CPC ...... E01C 23/088; E01C 23/127; B60K 25/00; B60K 25/02; B60K 2025/022
See application file for complete search history.

(56) References Cited

U.S. PATENT DOCUMENTS 4,171,147 A * 10/1979 Swisher, Jr. ............. B28D 1/18
                                                                299/39.8
2004/0021364 A1* 2/2004 Busley ................. E01C 23/088
                                                                299/39.4
(Continued)

FOREIGN PATENT DOCUMENTS

CN            2594299 Y     12/2003
DE    102005028091 A1 * 12/2006 ........... E01C 23/088
(Continued)

OTHER PUBLICATIONS

English language machine translation of Wachsmann et al., DE 102012738 A1, published Jan. 2, 2014 (11 pages) (Year: 2014).*
(Continued)

*Primary Examiner* — Janine M Kreck
*Assistant Examiner* — Michael A Goodwin
(74) *Attorney, Agent, or Firm* — Edell, Shapiro & Finnan, LLC

(57) ABSTRACT

Drive device for a construction machine, comprising a main device, a pump transfer gear with a pump transfer gear case, at least one hydraulic pump, a belt transmission and an auxiliary device whereby the auxiliary device is flanged to the pump transfer gear case. A construction machine including the drive device, for example, a road milling machine, includes a work roll.

15 Claims, 6 Drawing Sheets

(51) Int. Cl.
*E01C 23/12* (2006.01)
*F16H 37/06* (2006.01)

(56) References Cited

U.S. PATENT DOCUMENTS

| | | | |
|---|---|---|---|
| 2005/0206216 A1* | 9/2005 | O'Neill | E21C 31/02 |
| | | | 299/95 |
| 2006/0086076 A1* | 4/2006 | Krone | A01D 41/1274 |
| | | | 56/6 |
| 2015/0091363 A1* | 4/2015 | Reuter | B60K 25/02 |
| | | | 299/10 |
| 2015/0133246 A1 | 5/2015 | Desch | |
| 2015/0227120 A1 | 8/2015 | Laux | |

FOREIGN PATENT DOCUMENTS

| | | | | |
|---|---|---|---|---|
| DE | 102012012738 A1 * | 1/2014 | | |
| DE | 102012012738 A1 | 1/2014 | | |
| EP | 1167626 A1 | 1/2002 | | |
| EP | 1640201 A1 | 3/2006 | | |
| EP | 1983105 A2 | 10/2008 | | |
| EP | 2599921 A3 * | 7/2016 | | B60W 10/02 |

OTHER PUBLICATIONS

International Search Report for corresponding PCT Application No. PCT/EP2016/075396, 6 pages, dated Jan. 19, 2017.
Office Action in corresponding Chinese Patent Application No. 201680061451.3, dated Dec. 4, 2019, with English translation.

* cited by examiner

Fig. 7a
Fig. 7b
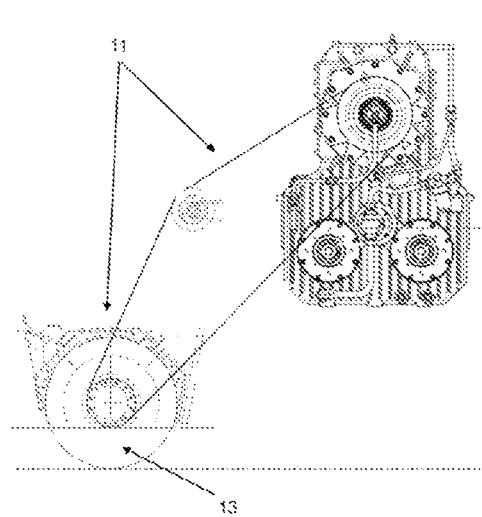
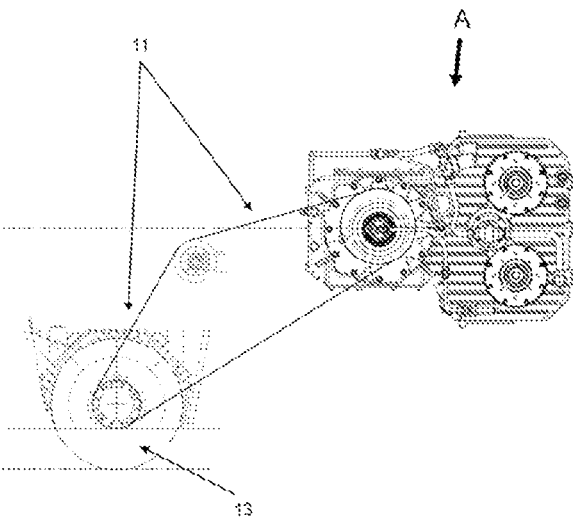
Fig. 8a
Fig. 8b
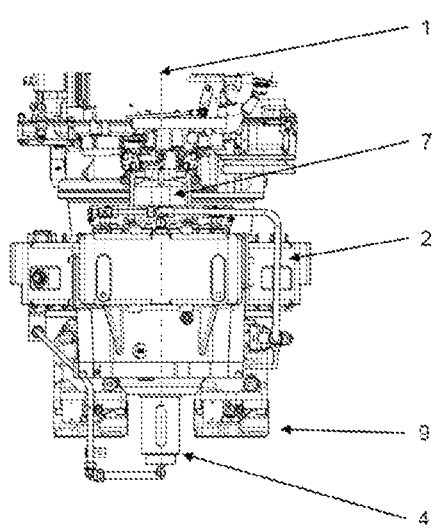
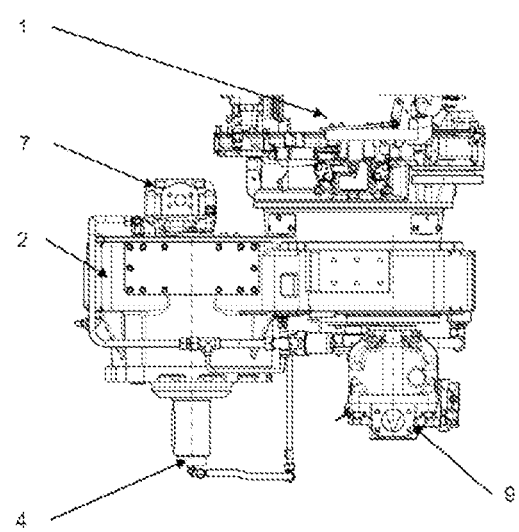

DRIVE DEVICE FOR A CONSTRUCTION MACHINE

FIELD OF THE INVENTION

This invention concerns a drive device for a construction machine as described herein, as well as for a construction machine as described herein.

BACKGROUND

A generic type of drive device is already known for example from EP 1 294 991 B2.

A drive device of this type essentially comprises a main drive, a pump transfer gear and a belt transmission. The belt transmission preferably comprises a first pulley, a second pulley and a belt arranged between the pulleys. The main drive drives the pump transfer gear, which has a least one output shaft, with which the first pulley is driven, and a second output shaft, with which a hydraulic pump is driven. The second pulley is preferably connected to a work roll or a milling drum.

In normal operation, the main drive, usually a diesel engine, drives the downstream components and the milling drum rotates at a suitable speed to mill the road surface and at the appropriate torque.

For maintenance purposes, it is desirable to rotate the milling drum at a slower rotational speed and low torque, to be able to drive it at a specific rotational position. For this purpose, the drive device has an auxiliary device, in most cases, a hydraulic motor or an electric motor.

In EP 1 294 991 B2, it is proposed that the auxiliary device should be coupled with the belt transmission via a friction roller. In this case, the friction roller can be coupled with the roller-side pulley. Alternatively, the auxiliary device can be coupled with at least one drive belt. Another alternative is that the auxiliary device is coupled with the belt transmission via a gear wheel. For example, at least one drive belt of the belt transmission can be comprised of a toothed belt, which engages with the gear wheel of the auxiliary device. In another embodiment, the roller-side pulley can have a gear wheel, which engages with the gear wheel of the auxiliary device.

Essentially, this proposed coupling of the auxiliary device mentioned in EP 1 294 991 B2 is limited to components of the belt transmission. The fact is that, for example, the torque transferable by a friction roller is limited and at a too high resistance point, for example, during a blockade of the work roll, the friction roller may slip through and the risk of accident can be reduced.

Nevertheless, such a coupling of the auxiliary device entails some possible disadvantages. For example, the belt transmission is generally susceptible to contamination or splash water or rainwater, thus, for example, the transmission of a constant torque is not ensured or is only inadequately ensured. Moreover, the wear and tear of a friction roller is very high, so, generally speaking, it has to be replaced more often.

SUMMARY OF THE INVENTION

This is where this invention comes into play and lays out the task to propose an improved drive device, specifically a drive device that introduces an auxiliary device that is less susceptible to contamination or splash water or rainwater.

This is accomplished with the drive device with the characteristic features as disclosed herein. Because the auxiliary device is flange-mounted on the pump transfer gear, the above-mentioned disadvantages can be overcome. No or only few further measures are needed to shield the auxiliary device from dirt and/or splash water. Additionally, the pump transfer gear and the auxiliary device have a very compact design.

Further advantageous embodiments of the proposed invention arise particularly from characteristics described herein.

A further task of this invention is to propose an improved construction machine, in particular a road milling machine, and in particular one whose drive device is less susceptible to contamination or splash water or rainwater.

This is accomplished with a construction machine with the characteristic features as described herein.

Further advantageous embodiments of the proposed invention arise particularly from characteristics described herein.

BRIEF DESCRIPTION OF THE DRAWINGS

Further characteristics and advantages of this invention are illustrated by the following description of preferred exemplary embodiments with reference to the enclosed illustrations. These show as follows:

FIG. 7a one possible orientation of a construction machine, in particular a road milling machine, having a drive device according to the present invention, viewed from the side (only components essential to the construction machine);

FIG. 7b another possible orientation of the construction machine of FIG. 7a viewed from the side;

FIG. 8a The construction machine of FIG. 7a viewed from above;

FIG. 8b The construction machine of FIG. 7b viewed from above.

DETAILED DESCRIPTION OF THE INVENTION

Figure 1:
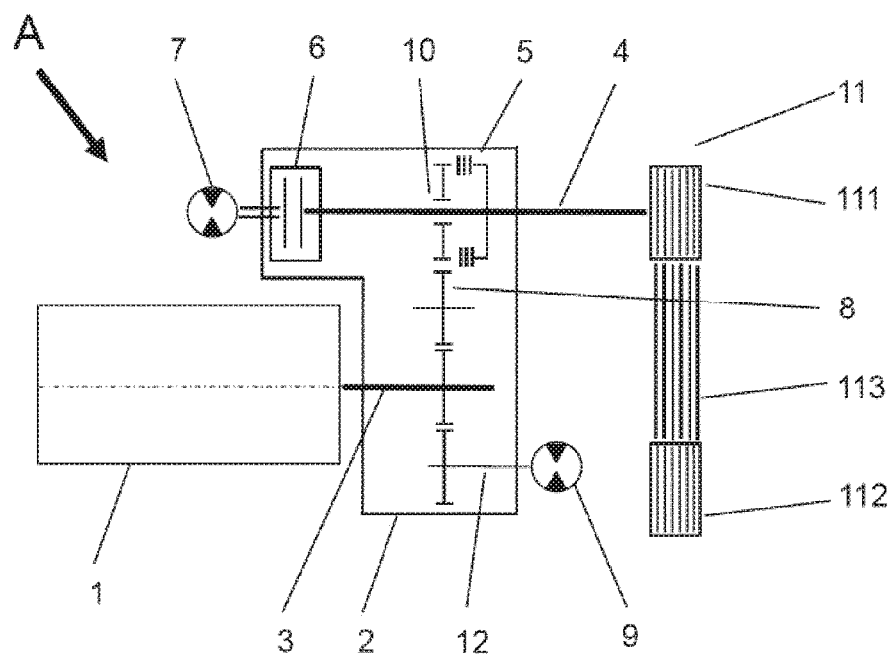
FIG. 1 shows a schematic sketch of an invented drive device.

The Following References are Used in the Illustrations

A Drive device
1 Main drive
2 Gear case
3 Gear case input shaft
4 First gear head output shaft
5 Switchable clutch
6 Overrunning clutch
7 Auxiliary device
8 Pump transfer gear/gear chain
9 Hydraulic pump
10 Roller bearing gear wheel 11 Belt transmission
12 Second gear head output shaft
13 Work roll
14 Elastic coupling
111 first pulley
112 second pulley
113 belt An invented drive device A essentially comprises a main device 1 and an auxiliary device 7, a pump transfer gear 8, a belt transmission 11, and at least a hydraulic pump 9.

The main device 1 drives the pump transfer gear 8. The main device 1 can for example be configured as a diesel engine.

The belt transmission preferably comprises a first pulley 111, a second pulley 112 and at least a belt arranged between the pulleys 113.

The pump transfer gear 8 preferably comprises a gear chain with gear case input and at least two gear case outputs. The pump transfer gear 8 is preferably configured as a gear train. Other construction forms are also possible. The gear case inputs or gear case outputs are configured, for example, as hollow shafts or gear wheels or gear flanges. Here are various conceivable embodiments.

The main device 1 is preferably connected via a gear case input shaft 3 with the gear case input of the pump transfer gear 8. Between the main device 1 and gear case input shaft 3, an elastic coupling 14 is preferably provided.

The belt transmission 11 is preferably connected via a first gear head output shaft 4 with the first gear case output of the pump transfer gear 8, whereby a switchable clutch 5 is provided between the first gear case output and the first gear head output shaft 4. The first gear head output shaft 4 is in turn connected with the belt transmission 11, in particular the first pulley 111. In other words, the first output shaft 4 and the belt transmission 11 can be coupled or uncoupled via the switchable clutch 5 from the torque flow of the pump transfer gear 8.

The second output shaft 12 is connected to the second gear case output of the pump transfer gear 8 and with at least one hydraulic pump 9.

The above mentioned connections primarily refer to the torque transmission of the respective connections.

The pump transfer gear 8 is preferably housed in a pump transfer gear case 2. Pump transfer gears and other components can also be housed in the pump transfer gear case 2, such as for example a hydraulic pump 9 and/or an overrunning clutch 6, so that the shafts, so to speak, are positioned internally.

It can be preferable that the first gear case output shaft 4 is guided through the pump transfer gear case 2, in particular the pump transfer gear 8, in particular the gear chain, preferably through a gear wheel of the first gear case output. For this purpose, a roller bearing 10 can be used or the gear wheel of the first gear case output is placed through the roller bearing 10 on the first gear case output shaft. With this measure, the auxiliary device 7 and/or the overrunning clutch 6 can be arranged in such a manner on the side of the pump transfer gear case 2 which is not facing the belt transmission 11, so that it gives a particularly compact construction.

An invented construction machine also essentially comprises the invented drive device and a work roll 13. Preferably the construction machine is configured as a road milling machine, so that the work roll is configured as a milling drum 13. The construction machine has additional components, such as a Chassis, undercarriage, etc., for which, however, at this point no further explanation is needed.

The second pulley 112 is connected to the work roll 13.

Figure 2:
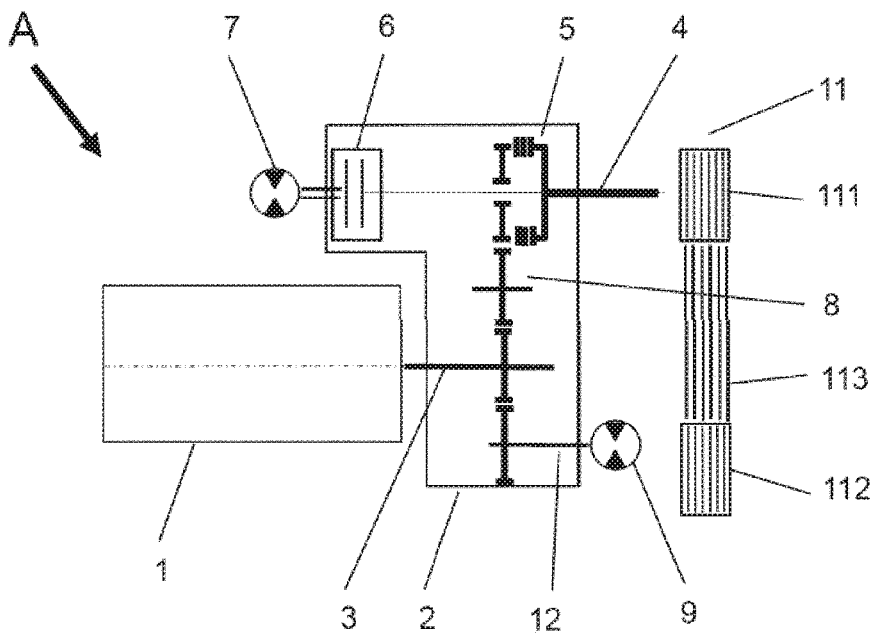
FIG. 2 a schematic sketch of an invented drive device.
Figure 3:
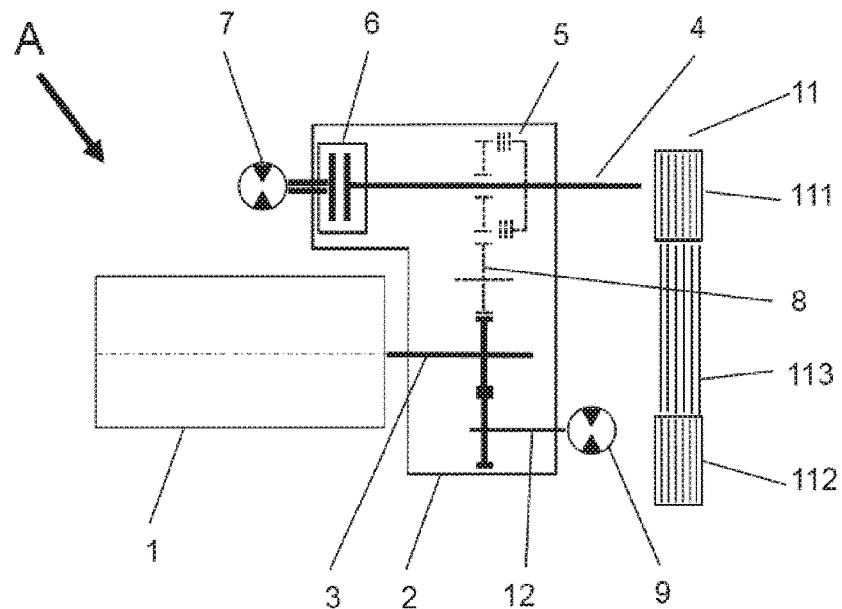
FIG. 3 shows a schematic sketch of an invented drive device with an indicated torque curve in the auxiliary device operation.
Figure 4:
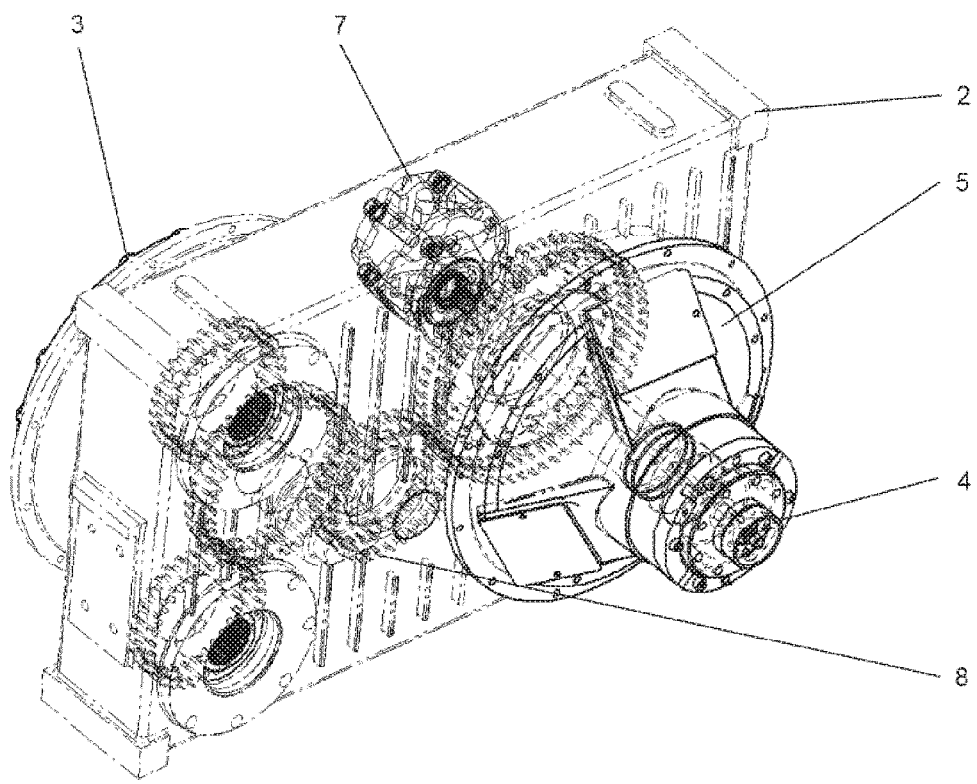
FIG. 4 shows a pump transfer gear with a flange-mounted auxiliary device of an invented drive device.
Figure 4A:
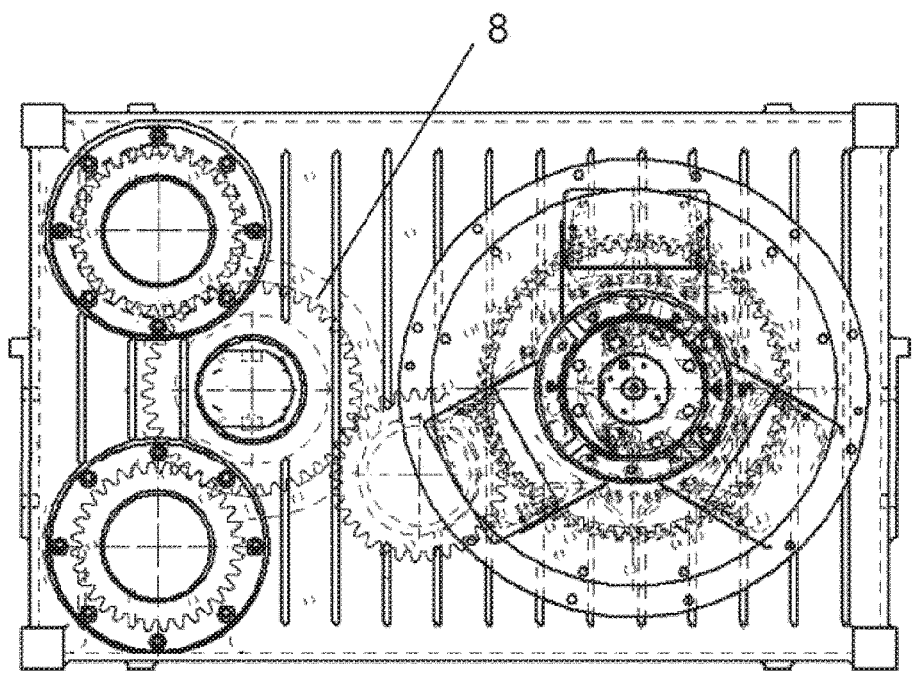
FIG. 4a-c show views according to FIG. 4.
Figure 4B:
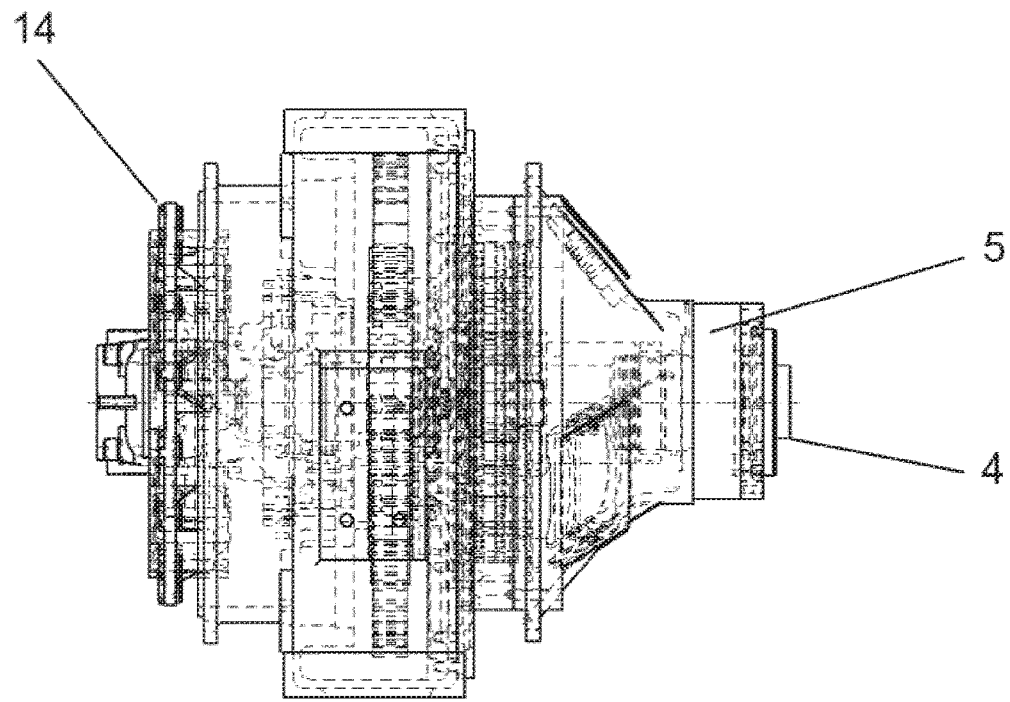
Figure 4C:
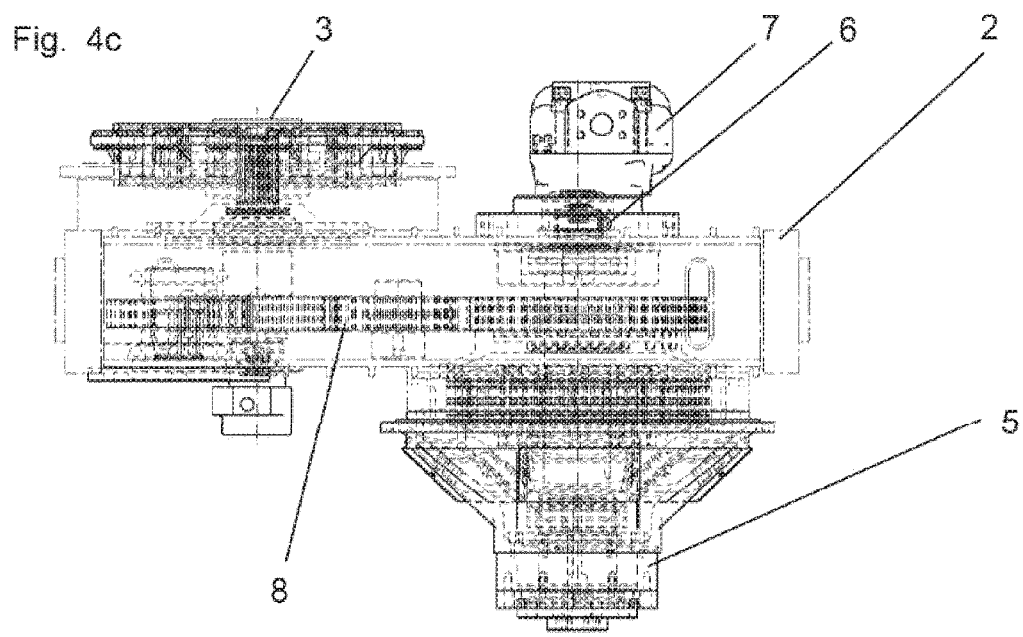

Further details of this invention will be subsequently explained with an example of a road milling machine as a construction machine. The embodiments refer particularly to FIGS. 1 to 4.

In operation mode, the main drive drives, in particular the diesel engine 1, via a gear case input shaft 3, the pump transfer gear, in particular the gear chain 8, and by closed coupling 5 the gear head output shaft 4.

The first gear head output shaft 4 drives via the belt transmission, in particular via the V-belt 11, the milling drum 13.

The auxiliary motor 7 is preferably separated via the overrunning clutch 6 of the rotating first gear head output shaft 4.

Via the pump transfer gear, in particular the gear chains 8, and the corresponding second gear head output shaft 12, one or more hydraulic pumps 9 are being driven at the same time. The hydraulic pumps are preferably used at the same time for the supply of the auxiliary device 7, when this is constructed as a hydraulic motor.

The function of the auxiliary device is as follows.

When service is required, the auxiliary device 7 shall slowly rotate on demand the first gear head output shaft 4 in order to, for example, support the changing of the chisel assembly of the milling drum 13.

For this purpose, when service is required, the coupling 5 is opened and therefore interrupts the preferably friction-type connection between the pump transfer gear, in particular the gear chain 8, and the gear head output shaft 4.

The diesel engine drives only the hydraulic pump 9 via the pump transfer gear, in particular the gear chain 8.

By switching on the auxiliary motor 7, a rotary motion and a torque are transmitted to the first gear head output shaft 4, via the overrunning clutch 6.

Figure 5:
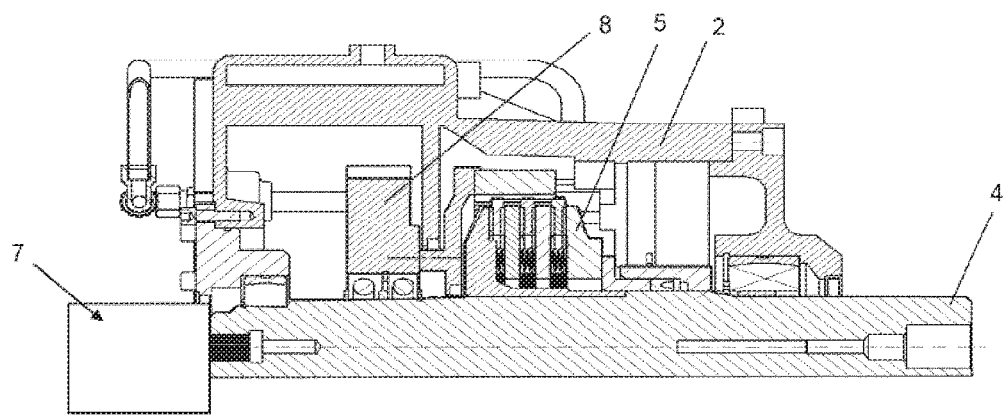
FIG. 5 shows a detailed presentation of an invented drive device without an overrunning clutch.
Figure 6:
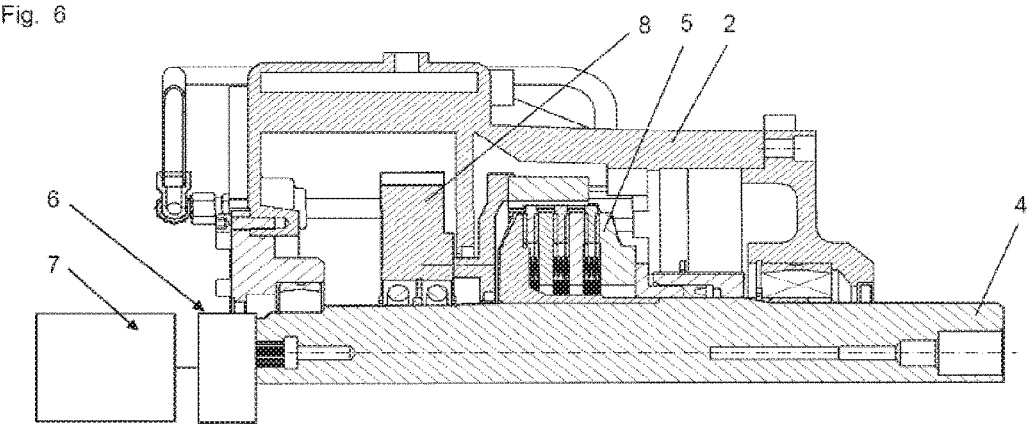
FIG. 6 shows a detailed presentation of an invented drive device with an overrunning clutch.

Further details of this invention will be subsequently explained with an example of a road milling machine as a construction machine. The embodiments refer particularly to FIGS. 5 to 8.

A road milling machine is used for the removal of the road surface. For this purpose, it is equipped with a milling drum, that is fitted with chisels in different arrangements.

Due to the fact that this chisels are subject to considerable wear and tear, they have to be frequently replaced. For safety reasons, the diesel engine that generally drives the milling drum, has to be switched off and to stand still. Afterwards, in order to slowly further rotate the milling drum while replacing the chisels, the drum has to be moved by hand.

Since nowadays most road milling machines have a pump transfer gear on the flywheel side of the diesel engine, the inventive idea is to design this transfer case in a different way, so that it becomes possible to place on the side of the diesel engine an electric or hydraulic auxiliary motor.

The road milling machines usually have a 24V-battery or electrically driven emergency units for hydraulics "on board," so that it is also possible to drive the auxiliary motor without the diesel engine running.

The drive that is designed as a diesel engine, drives the gear case input shaft via an elastic coupling. On the first gear case input shaft, which is driven by the gear chain, there is a coupling insert of a wet (in oil) or dry-running clutch, which, in turn, is connected to a gear wheel of the gear chain. At the tip of the first gear case input shaft, outside the transmission, sits the first pulley which drives the milling drum via a belt drive.

The function is described as follows. In the switched off mode of the clutch, the diesel engine driven gear case input shaft rotates with the gear wheel and the coupling insert. The first gear case input shaft with the inner parts of the switched-off coupling, as well as the first pulley at the shaft output stand still; the milling drum stands.

In the switched-on mode of the clutch, the positioned gear wheel is connected to the inner parts of the clutch, so that also the first gear case input shaft rotates and drives the milling drum. The necessary hydraulic pumps for the milling drum are driven via different gear chains or the second gear case output shaft in the transmission box.

During the above mentioned replacement of the chisels, the diesel engine is now stopped and stands still. The clutch is open and pivoted in the first gear case output shaft.

In this way, the first gear case output shaft can be slowly driven by an electric or hydraulic motor. This shaft in turn drives the belt drive of the milling drum parallel to the stationary diesel engine shaft.

So that the electric or the hydraulic motors do not constantly rotate in a normal milling drum, it is possible to place a freewheel between the first gear case output shaft and the auxiliary device.

What is claimed is:

1. A drive device for a construction machine, comprising
a main drive,
a pump transfer gear with a pump transfer gear case,
at least one hydraulic pump,
a belt transmission and
an auxiliary device, wherein the auxiliary device is mounted on the pump transfer gear case,
wherein the auxiliary device is connected to a first gear case output shaft, and
wherein the auxiliary device is connected via an overrunning clutch to the first gear case output shaft, whereby the overrunning clutch is located in the pump transfer gear case.

2. The drive device according to claim 1, wherein the main drive is configured as a diesel engine.

3. The drive device according to claim 1, wherein the pump transfer gear has a gear case input and at least two gear case outputs, comprising a first gear case output and a second gear case output.

4. The drive device according to claim 3, wherein the main drive is connected via a gear case input shaft to the gear case input of the pump transfer gear.

5. The drive device according to claim 3 wherein the belt transmission is connected via a first gear case output shaft to the first gear case output of the pump transfer gear, whereby a switchable clutch is provided between the first gear case output and the first gear case output shaft.

6. The drive device according to claim 3 wherein the at least one hydraulic pump is connected via a second gear case output shaft to the second gear case output of the pump transfer gear.

7. The drive device according to claim 1 wherein the belt transmission comprises a first pulley, a second pulley and at least one belt arranged between the first and second pulleys.

8. The drive device according to claim 7 wherein the first pulley is connected to a first gear case output shaft.

9. A construction machine, configured with a drive device according to claim 7 further comprising a work roll.

10. The construction machine according to claim 9, wherein the work roll is connected to the second pulley.

11. The construction machine according to claim 9 wherein the work roll is a milling drum.

12. The construction machine according to claim 9 wherein the construction machine is a road milling machine.

13. The drive device according to claim 1 wherein the auxiliary device is configured as a hydraulic or electric motor.

14. The drive device according to claim 1 wherein a first gear case output is guided through the pump transfer gear case.

15. The drive device according to claim 14 wherein the first gear case output shaft is guided through a gear train of the pump transfer gear and through a gear wheel of a first gear case output.

* * * * *